United States Patent
Ho

(10) Patent No.: US 6,233,871 B1
(45) Date of Patent: May 22, 2001

(54) DESIGN OF PLANTER INSERTS AND WATER RESERVOIRS

(76) Inventor: I-Chung Ho, 6958 Grovespring Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/294,562

(22) Filed: Apr. 20, 1999

Related U.S. Application Data

(63) Continuation-in-part of application No. 08/873,070, filed on Jun. 11, 1997, now Pat. No. 5,934,017.

(51) Int. Cl.[7] .......................... A01G 27/02; A01G 27/00; A01G 25/00
(52) U.S. Cl. .................................. 47/79; 47/48.5; 47/66.6
(58) Field of Search .............................. 47/66.6, 79, 48.5, 47/80–82, 66.3, 62 A, 76, 78, 66.5, 17, 60, 73

(56) References Cited

U.S. PATENT DOCUMENTS

| | | | |
|---|---|---|---|
| 2,249,197 | * 7/1941 | Brundin | 47/64 |
| 2,723,341 | * 11/1955 | Greenspan | 362/154 |
| 3,067,543 | * 12/1962 | Bracey | 47/80 |
| 3,271,900 | * 9/1966 | Mori | 47/80 |
| 3,753,315 | * 8/1973 | Adam | 47/79 |
| 4,185,414 | * 1/1980 | Miller | 47/62 C |
| 4,341,040 | * 7/1982 | Smith | 47/73 |
| 4,805,342 | * 2/1989 | Jenkins et al. | 47/79 |
| 4,999,947 | * 3/1991 | Whitaker | 47/81 |
| 5,277,877 | * 1/1994 | Jeffrey et al. | 47/66.6 |
| 5,329,729 | * 7/1994 | Liang | 47/81 |
| 5,454,187 | * 10/1995 | Wasserman | 47/39 |
| 5,749,170 | * 5/1998 | Furuta | 47/79 |

FOREIGN PATENT DOCUMENTS

| | | | |
|---|---|---|---|
| 1156646 | * 11/1983 | (CA) | 47/79 V |
| 195542 | * 9/1985 | (EP) | 47/79 V |
| 2305123 | * 10/1976 | (FR) | 47/79 I |
| 2218609 | * 11/1989 | (GB) | 47/79 V |
| 2250171 | * 6/1992 | (GB) | 47/79 V |

* cited by examiner

*Primary Examiner*—Peter M. Poon
*Assistant Examiner*—Son T. Nguyen

(57) ABSTRACT

Improved planter inserts to be used in conjunction with ordinary or decorative planters for growing houseplants in potting soil or hydroponically in pebbles or other potting medium for the purpose of reducing the work of maintaining the plants and improving the characteristics of purifying ambient air quality. A separate water reservoir is attached to the planter insert such that the water level in the planter insert is maintained constant at all times. The watering frequency is reduced because of the large water reservoir. Additional features may be added to the planter insert to further enhance the effectiveness of air purification by the plants. A simple planter insert is used to increase the interface areas of ambient air with the potting medium and the root system. The second planter insert includes a circulation fan to increase the circulation of air through the potting medium and the root system. The third planter insert includes a lamp with or without a circulation fan. The addition of a lamp will help to sterilize the air.

The non-spill water reservoir can be made to turn over to nearly 180 degrees after refill without spilling its content thus making the insert of water reservoir easy. For very large planter inserts and water reservoirs, the removal of water reservoir for refill becomes impractical. A special designed feature of the improved water reservoir allows the refill of water reservoir in place without spillage.

A specially designed water level indicator is also provided to indicate water level within a small viewing area of the water reservoir.

15 Claims, 8 Drawing Sheets

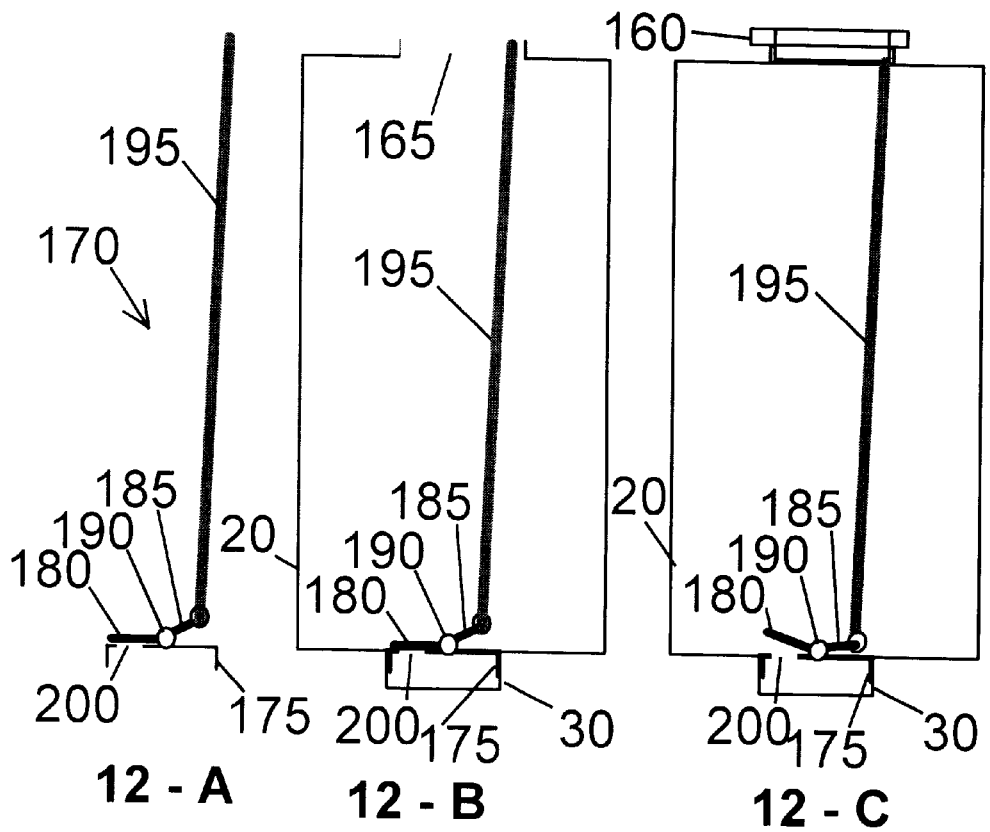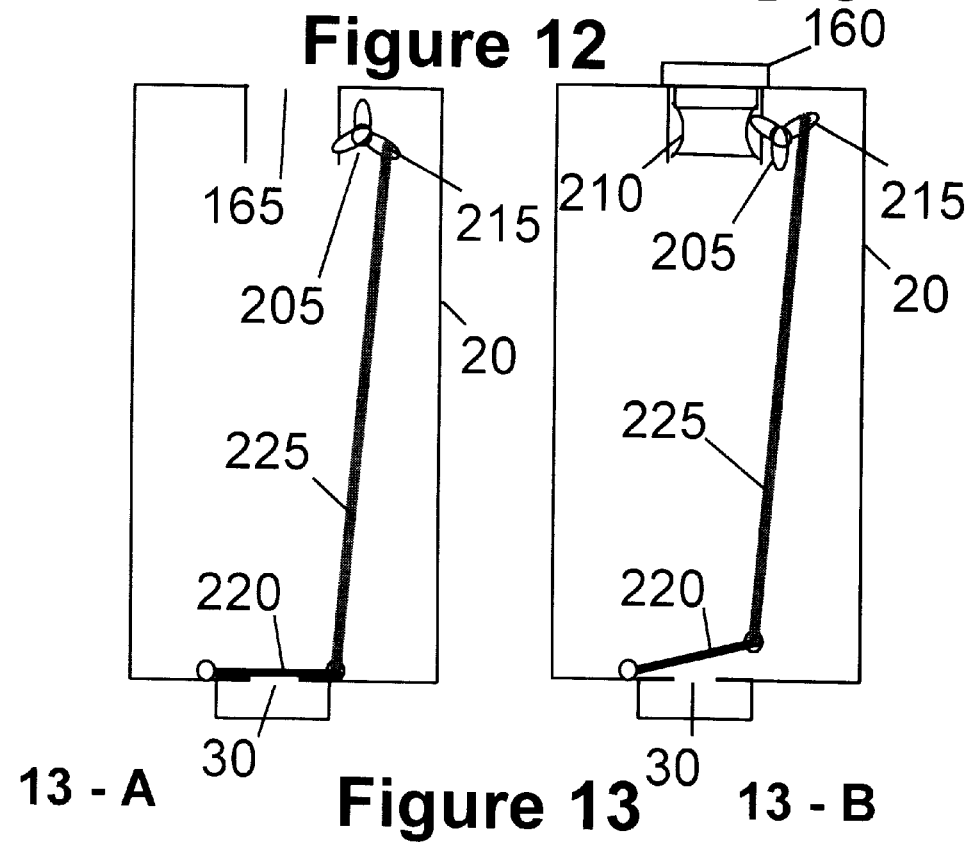

DESIGN OF PLANTER INSERTS AND WATER RESERVOIRS

CROSS REFERENCE TO RELATED APPLICATION

This application is a continuation-in-part of application Ser. No. 08/873,070 filed Jun. 11, 1997 now U.S. Pat. No. 5,934,017 which is incorporated herein in its entirety by this reference.

BACKGROUND OF THE INVENTION

It is well known that plants need air, water, and light for growth. It is also known that plants purify air. The purification of air through plant leaves are well known. However, the role of complex biological and bacterial process of plant's root system in breaking down air polluting chemicals and suppress the growth of microbes was only became understood in recent years.

Since the energy crisis in the 70's, new homes are being built with energy efficiency in mind. To achieve this, buildings are tend to have less air circulation with the outside air and better seal around doors and windows. The result of these changes in addition to the wide spread use of plastics, paints and other synthetic materials and chemicals, the indoor air pollution have become a serious health problem. Which resulted in the so called sick air syndrome. Several air purification planters and apparatus were proposed by U.S. patents such as U.S. Pat. Nos. 5,217,696; 5,269,094; 5,351,438; and 5,433,923. These patents suggest means to improve the interaction of air with the root system of the plants. Major deficit of these designs include 1) lack of sufficient water reservoir in the planter which increases the work of maintaining the plants, 2) relatively large variation of water level within the planter which is, in many respect, an undesirable consequence of being unable to control a constant water level in the planter.

On the market everywhere, there are many kinds of the so called "self watering" planters available to the public. There are very little difference among these planters. The basic feature of these "self watering" planters is that a small water reservoir at the bottom of the planter with a water filling opening near the bottom of the planter side wall. Perforated divider separates soil with water reservoir except that there are few studs or channels in the divider which extend down into the water reservoir and all the way to the bottom of the planter so that soil in these studs or channels were able to be submerged in the water at any given water level in the water reservoir. Capillary action of the soil were able to lift water to the root system and support plant growth. The disadvantages of these "self watering" planters include 1) the size of the water reservoir is usually small and the uncontrollable water level also change with time, 2) the bottom exposed portion of the soil and the water reservoir are directly open to the ambient air through the water refill opening and thus mildew or microbes growth is a common problem.

This invention relates to a planter insert with separate water reservoir to be placed inside a planter. It is capable of maintaining a constant water level in the planter insert. Because the water reservoir is separate to the planter insert, the size of the water reservoir may be made as big as one wishes. For planter insert with very large water reservoir, it is not practical to remove the water reservoir for refill, a special design feature is provided to enable the refill in place without spilling water.

With different features in the planter inserts, the interface areas of ambient air with the potting medium and the root system is maximized, thus enhances the effectiveness of air purification process by the root system. Optional lamp and circulation fan are also provided. The location of the fan is imbedded within the potting medium underneath the planter insert thus greatly reduced the vibration and noise level of the fan.

SUMMARY OF THE INVENTION

It is an object of the present invention to provide an improved planter insert for plants to be placed inside an ordinary or decorative planter.

It is another object of the present invention to provide a separate water reservoir for the planter insert. The bottom of the water reservoir (when turned over and inserted into the planter becomes the top of the reservoir) is provided with a small viewing area for a water level indicator so that water level inside the water reservoir is in clear view.

It is another object of the present invention to provide and maintain constant water level in one or more planter insert(s) connected together and placed inside the same planter with a single water reservoir.

It is another object of the present invention to increase the interface surface areas between ambient air with the potting medium and the root system. The improved air circulation and the inclusion of a lamp are all means of improving the effectiveness of air purification and sterilization.

It is yet another object of the present invention to provide an improved water reservoir such that it is easier to turn over for insert to the planter without the concern of spilling.

The present invention includes an improved planter insert which has a shallow water well at the bottom of the planter insert. A water reservoir with a curved neck can be seated at the opening of the shallow water well. A constant water level is maintained inside the planter insert which is achieved by the partial vacuum created within the water reservoir and water surrounding the mouth opening of the water reservoir.

Planter inserts with different complexity may be placed inside the planter for different purposes. The simplest planter insert will help to increase the interface areas of ambient air with the potting medium and the root system thus improves the breathing or circulation of air in the root system and enhance the air purification process by the root system. The second planter insert includes a circulation fan such that the circulation of air is greatly increased. The third planter insert includes a lamp and a circulation fan. The lamp using either incandescent bulb or bulb with ultra violet feature will help to disinfect the air being circulated around the bulb. The inclusion of a fan will further enhance the air circulation.

For air purification purpose, hydroponically soil-less planting is the desirable approach. Water absorbing pebbles such as expended clay and zeolite with or without activated carbon are ideal potting medium. This type of potting medium often leave many void air spaces in the potting medium and the root system and allows circulating air to be scrubbed by the wet pebble surfaces and the root system and maximizing the effect of air purification.

Conventional potting soil may also be used in this planter insert. The air purification property does reduced considerably, nevertheless, it is still better than the regular planter. Other advantages of the planter insert described earlier still apply.

The curved neck design of the water reservoir provides a unique feature which allows the water reservoir to be turned over to a predetermined angle with the liquid line inside being higher than the opening of the water reservoir without spilling any liquid after refill. This makes the non-spill insertion of water reservoir into the planter possible.

BRIEF DESCRIPTION OF THE DRAWINGS

FIG. 12 shows the operation of check valve used in the embodiment shown in FIGS. 10 and 11.

FIG. 13 shows the operation of an alternate check valve used in the embodiment shown in FIGS. 10 and 11.

DETAILED DESCRIPTION OF THE INVENTION

Figure 1:
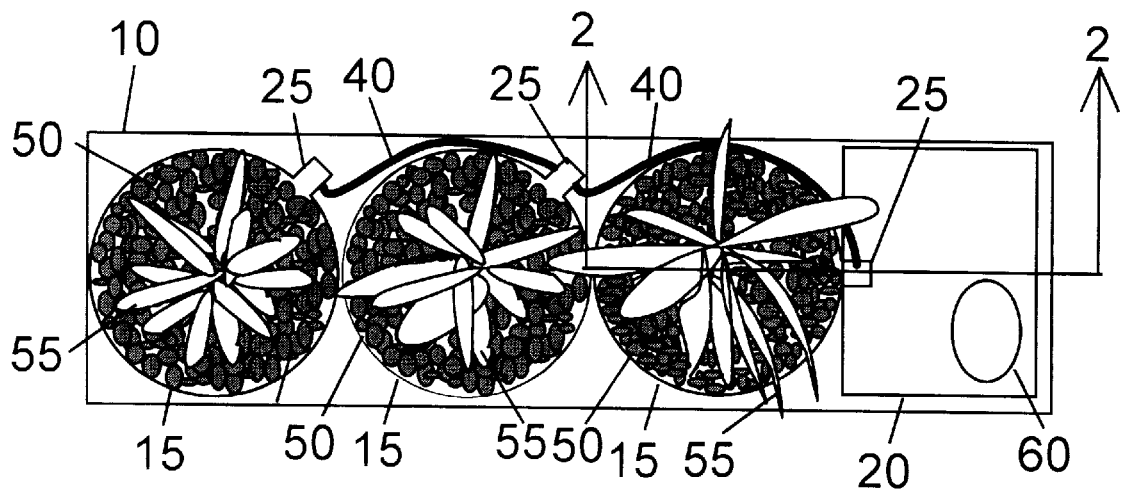
FIG. 1 is a top view of the planter insert of the present invention.

FIG. 1 shows the top view of a planter 10 which could be any ordinary existing planter. As an example, FIG. 1 shows a rectangular planter 10 with three planter inserts 15 inside, the shape of this planter can be square, circular, rectangular or any other shapes and sizes. Depending on the shape and size of the planter 10, one or more planter insert(s) 15 can be inserted into the planter. Regardless of the number of planter inserts in planter 10 there is only one water reservoir 20 needed. All planter insert(s) 15 will be sharing water supply from this common water reservoir 20. The planter insert has an exterior shallow water well 25 at the bottom of the planter insert to receive the discharge opening mouth 30 of the water reservoir 20 (better shown in FIG. 2). Partial vacuum inside the water reservoir 20 and the height of the discharge opening mouth 30 will control the water line 35 in the shallow water well 25 at a constant level for as long as there is water in the water reservoir 20. Connecting tubes 40 connect all shallow water wells 25 together. Since all planter inserts are at the same elevation, water from water reservoir 20 can be distributed to every planter insert's shallow water well 25 and maintain all water lines 35 to the same level. Small opening 45 (shown in FIG. 2) on the side wall of the planter insert 15 communicates shallow water well 25 with the interior of the planter insert thus allowing water to enter the planter insert 15 to feed the potting medium 50 and plants 55 in each planter insert 15. Usually the side wall of planter 10 is made of material that is opaque, water level inside water reservoir 20 is hard to determine. The exposed upper end of the water reservoir 20 (the bottom of the water reservoir after turned over and inserted to the planter becomes the top exposed surface) will not have a good clear view of the full depth of water reservoir. A specially designed water level indicator can be attached to the water reservoir requiring only a relatively small transparent viewing area 60 to show the entire range of water level. The design and its operation of this water level indicator will be described later in FIG. 14.

As an alternate, one single shallow water well that is large enough to receive all the planter insert(s) and the water reservoir may be used in stead of individual shallow water wells and connected with connecting tubes. The planter itself could also be acted as shallow water well as long as the drain holes (if any) in the planter are located above the desired water level line.

Figure 2:
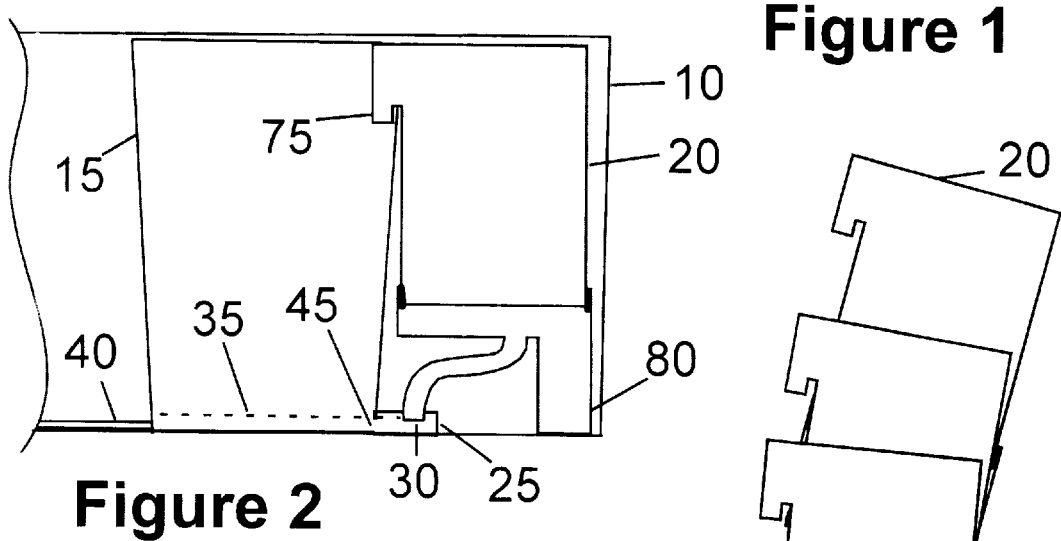
FIG. 2 is a partial cross-sectional view of FIG. 1 along line 2—2.

FIG. 2 is a cut away partial cross-sectional view of FIG. 1 along line 2—2 with potting medium and plants omitted from the planter insert. All planter inserts 15 in FIG. 1 are placed at the same elevation (only one planter insert is shown) and are connected through connecting tube 40 at shallow water wells. This assures that the water level line 35 at each and every planter inserts be at the same level and is maintained by water reservoir 20 at the discharge opening mouth 30. Potting medium and plants inside each planter insert (omitted from the figure) is therefore supported with proper water supply for plant growth.

Figure 3:
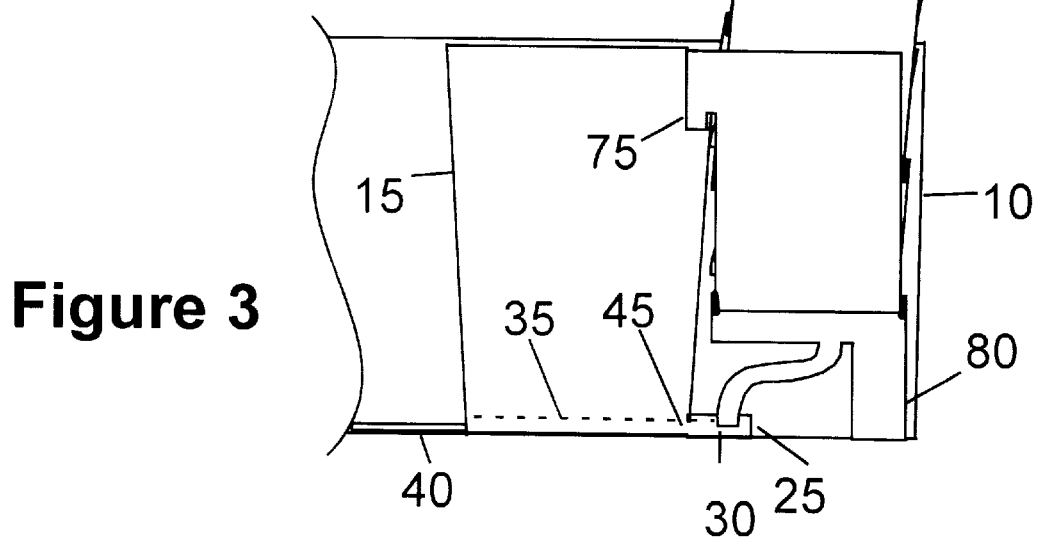
FIG. 3 is the same cross-sectional view of FIG. 2 showing the insertion of the non-spill water reservoir of the present invention.

FIG. 3 shows the same cross-sectional view of FIG. 2 except that this figure shows how the water reservoir is inserted into the planter after water is refilled and the reservoir is partially turned over almost 180 degrees. Because of the extended curved neck feature incorporated into the design, the water reservoir 20 is capable of turning over with water level inside the water reservoir being above the discharge mouth opening without spilling any water.

Figure 4:
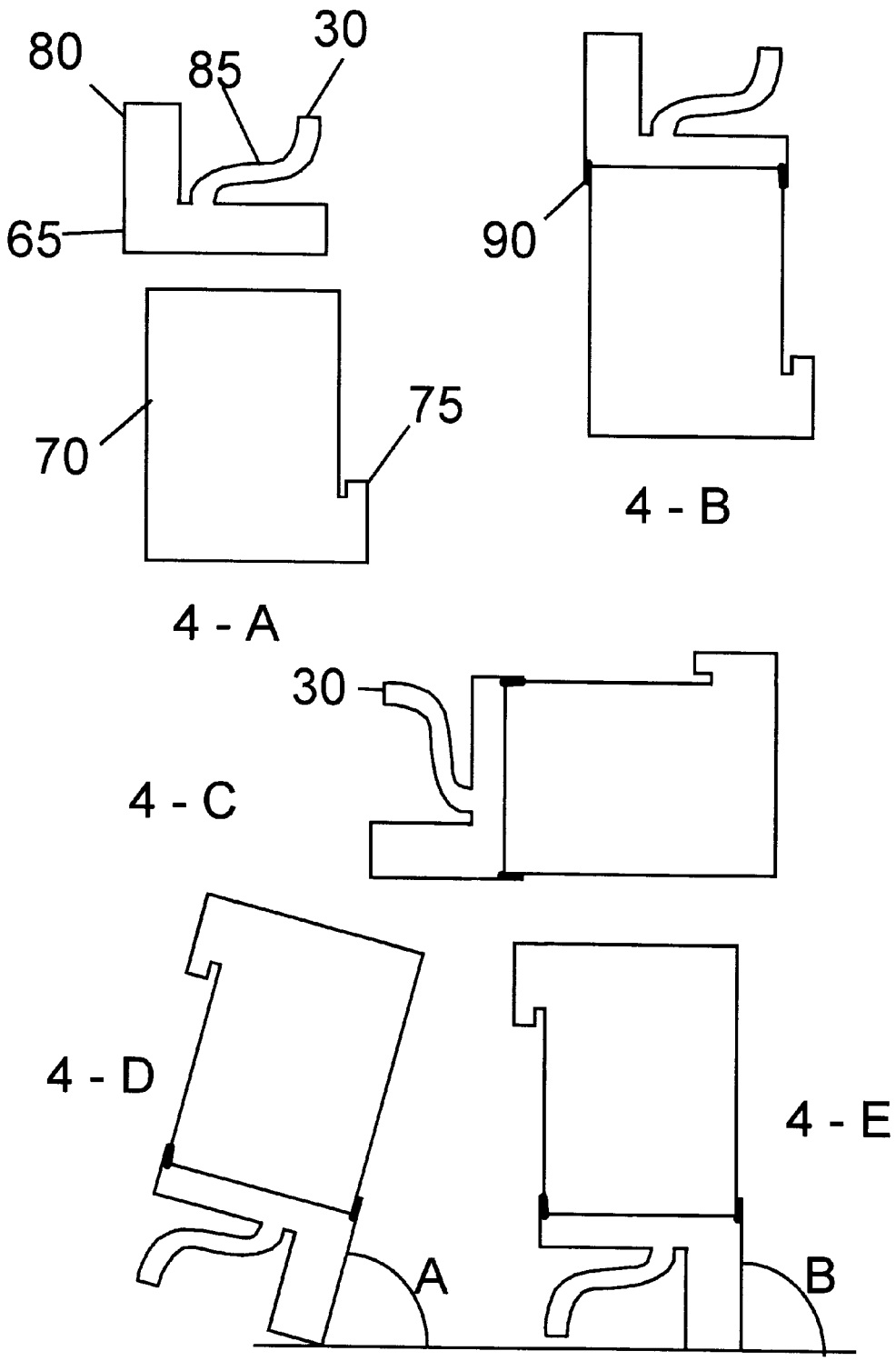
FIG. 4 is the cross-sectional views of non-spill water reservoir of the present invention.

FIG. 4 shows five cross-sectional views of the non-spill water reservoir 20 at different stages of refilling and inserting into the planter. FIG. 4-A shows that the water reservoir is turned right side up with the cap 65 removed from the body of the water reservoir 70 for refilling. A hook 75 is provided for hanging onto the planter insert. It is shown as part of the reservoir but can be a separate piece and attached to the reservoir. The cap 65 has a supporting stand 80 used to support the water reservoir and maintains the proper height of the discharge mouth opening 30 while inserted into the planter 10. The extended curved neck 85 is also attached to the cap in this example. FIG. 4-B shows that the water is refilled and the cap 65 is attached to the water reservoir body 70 with a sealing gasket 90. FIGS. 4-C and 4-D show the water reservoir is turned over for insertion into the planter. Because the extended curved neck 85 has the form of a number "7", or in the form of a letter "Z" or "S" and it is oriented correctly with the "7", "Z" or "S" shaped curved neck in the upright position where the mouth opening end of the curved neck 85 is on the upper most location when the water reservoir is laid down flat (as shown in FIG. 4-C) before tilting further (as shown in FIG. 4-D), water inside this water reservoir will not start to flow out as long as the tilting angle A (shown in FIG. 4-D) is less than the predetermined tilting angle. After insertion, the water reservoir is hooked to the planter insert and seated inside the planter (as shown in FIG. 2). And the water reservoir 20 is positioned upright as shown in FIG. 4-E where the angle B is greater than the predetermined tilting angle. Water will start to flow out and control the proper water level line 35 inside the shallow water well 25. Water reservoir shown in FIG. 4 is just an exemplary configuration. The Water reservoir body 70 and the cap 65 could be an integral single piece with a simple refill hole for refilling or without any hole other than the discharge opening hole 30. In this case, the refilling will be accomplished through the discharge opening hole 30.

Figure 5:
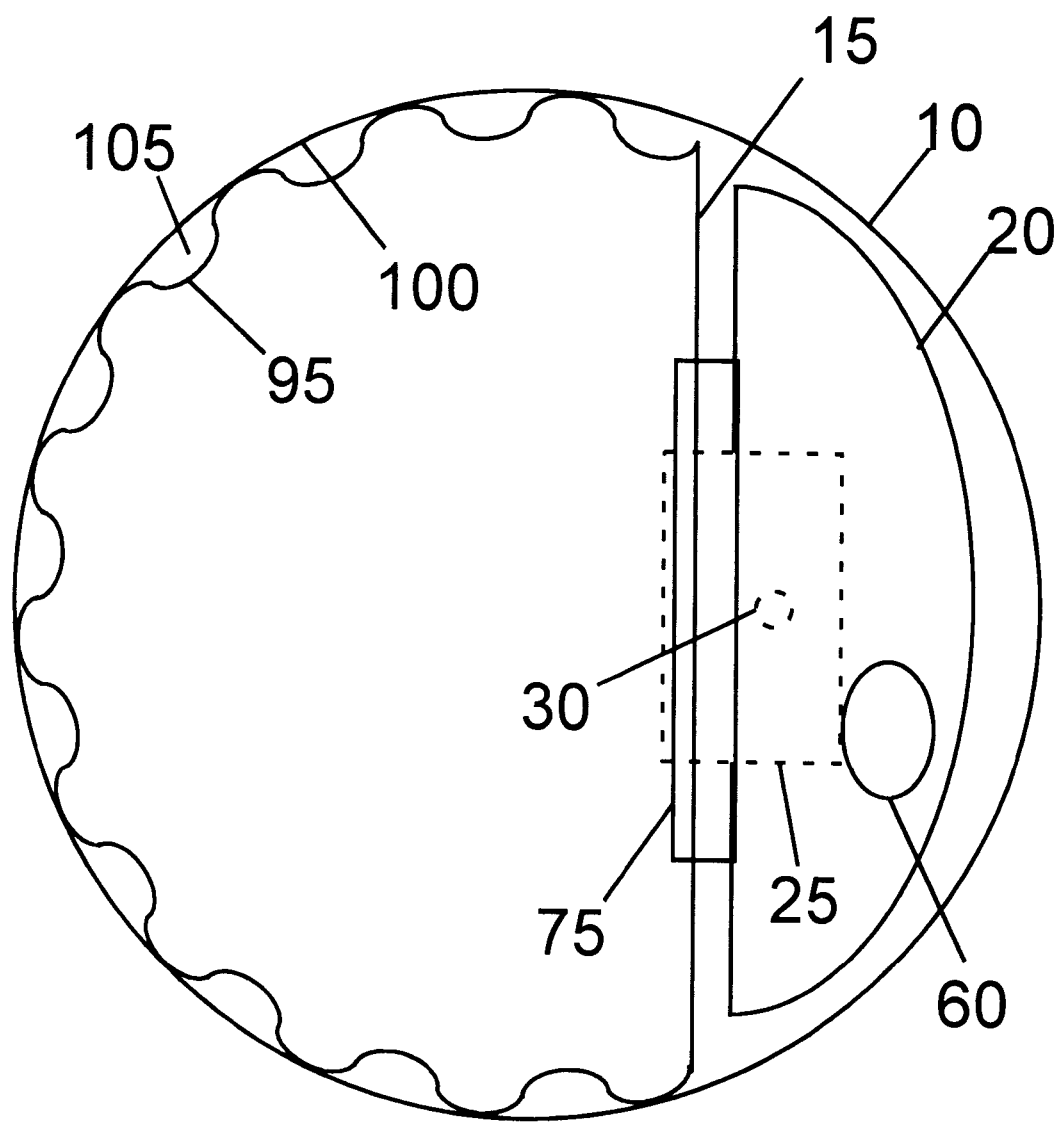
FIG. 5 is a top view of an alternate embodiment of the present invention.

FIG. 5 shows the top view of an alternate embodiment of the present invention. The planter insert 15 has wavy side walls 95 against the interior of the planter side wall 100. In this example, only one planter insert 15 is fitted inside the planter 10. Water reservoir 20 hangs to the side wall of the planter insert with its hook 75 and its discharge opening mouth 30 is received by the shallow water well 25. The purpose of this planter insert 15 is to provide a maximized interface areas of ambient air with the potting medium and the root system of the plant (not shown and omitted from the figure). This is achieved by utilizing any suitable forms of wavy side walls 95 of the planter insert 15 against the inside surfaces of the planter side walls 100 such that narrow air passageways 105 are formed. The wavy side walls 95 have small holes or perforations 110 (shown in FIGS. 6 and 8). These holes allow the breathing of the root system with ambient air in the air passageways 105. Potting medium fill the planter insert where plant is potted (not shown). The bottom layer of the potting medium submerged under the water level line. Capillary action along with the suction of the root system carry water to the upper portion of the potting medium and therefore support the plant growth. A small transparent area 60 on the water reservoir 20 is also shown where the water level indicator may be attached.

Figure 6:
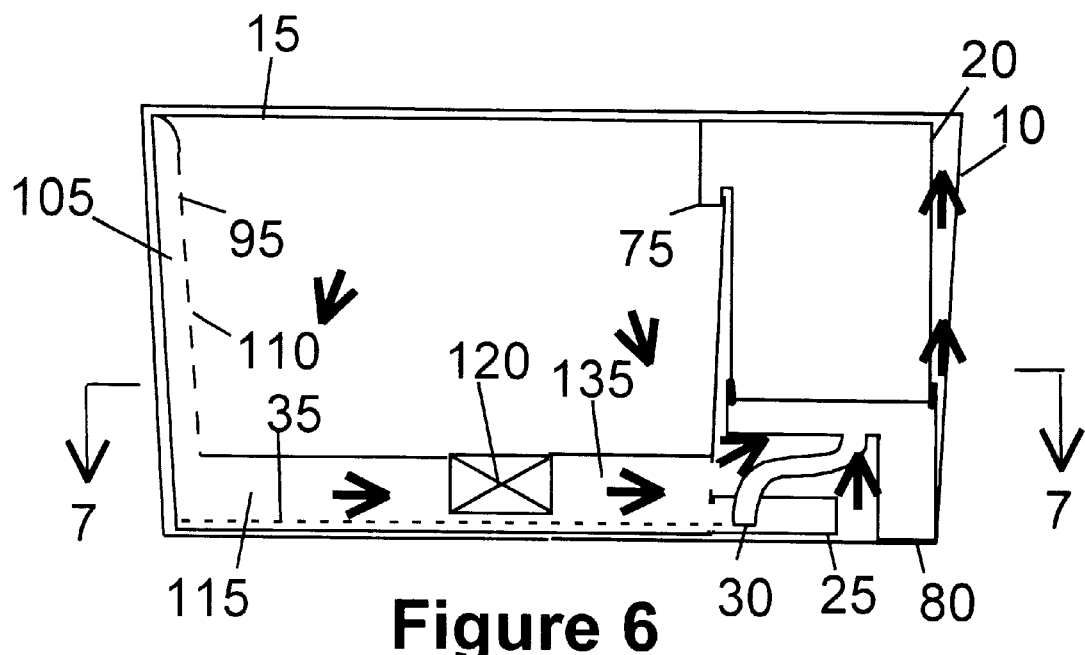
FIG. 6 is a cross-sectional view of another alternate embodiment of the present invention.
Figure 7:
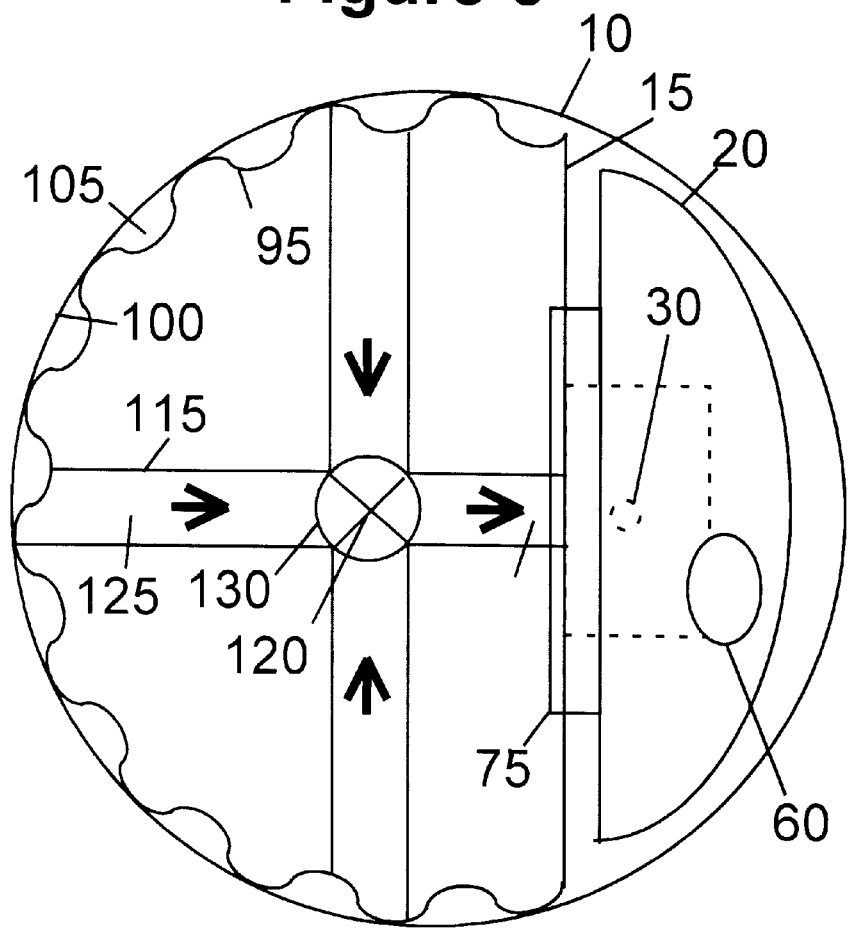
FIG. 7 is the cross-sectional view of FIG. 6 along line 7—7.

FIG. 6 shows the cross-sectional view of another alternate embodiment of the present invention. This embodiment has basically the same construction of FIG. 5 except that additional air passage partitions and an air circulation fan 120 is added. FIG. 7 is the cross-sectional view of FIG. 6 along line 7—7. The purpose of this planter insert 15 is the inclusion of a circulation fan 120 to enhance air flow in addition to maximize the interface areas of ambient air with the potting medium and the root system of the plant (not shown). The wavy side walls 95 of the planter insert 15 against the inside surfaces of the planter side walls 100 formed narrow air passageways 105. The wavy side walls 95 have small holes or perforations 110 for air to pass through. A circulation fan 120 is located at the bottom center of the planter insert 15 slightly above the water level line 35. The use of circulation fan helps to increase air flow through the potting medium and the root system. The circulating air is than passed through the small holes or perforation 110 of the planter insert and down through the air passageways 105 to the bottom of the planter. Partition walls 115 at the bottom of the planter insert forms air inlet ducting 125, which guides the circulating air toward the suction side 130 of the fan 120. Discharge duct 135 guides the exhaust air to the ambient through the gaps of water reservoir 20 and the planter 10. Potting medium fill the planter insert where the plant is potted (not shown). The bottom layer of the potting medium submerged under the water level line 35. Capillary action along with the suction of the root system carry water to the upper portion of the potting medium and therefore support the plant growth. A small transparent area 60 on the water reservoir is also shown where the water level indicator may be attached.

Figure 8:
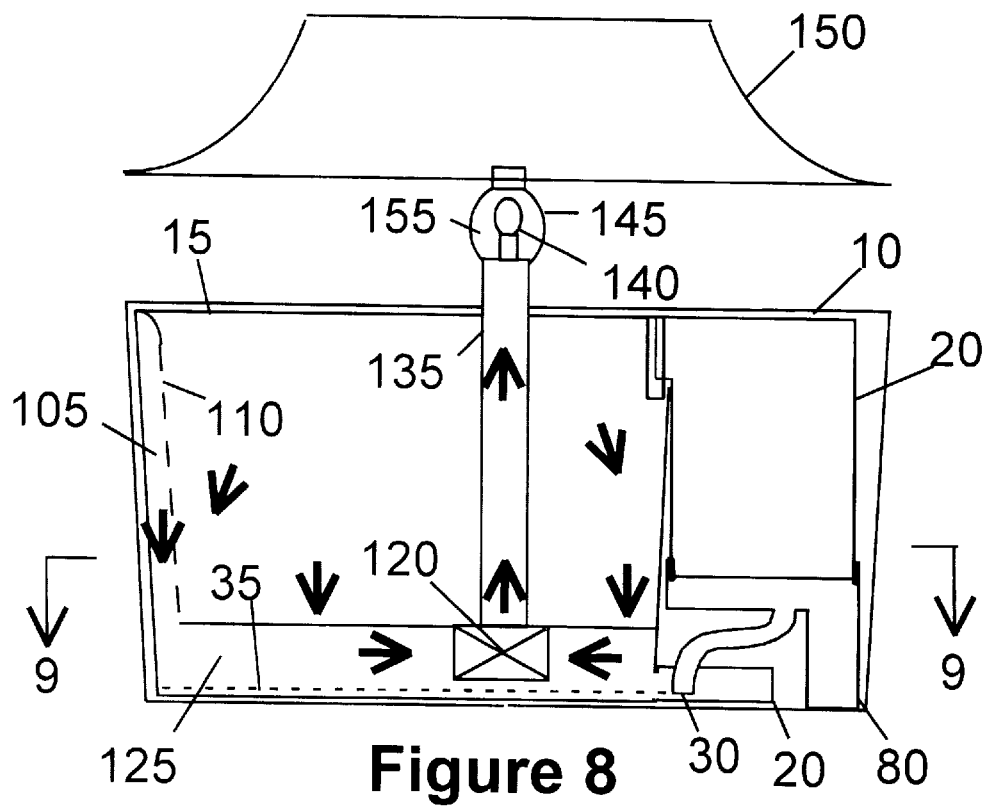
FIG. 8 is a cross-sectional view of another alternate embodiment of the present invention.
Figure 9:
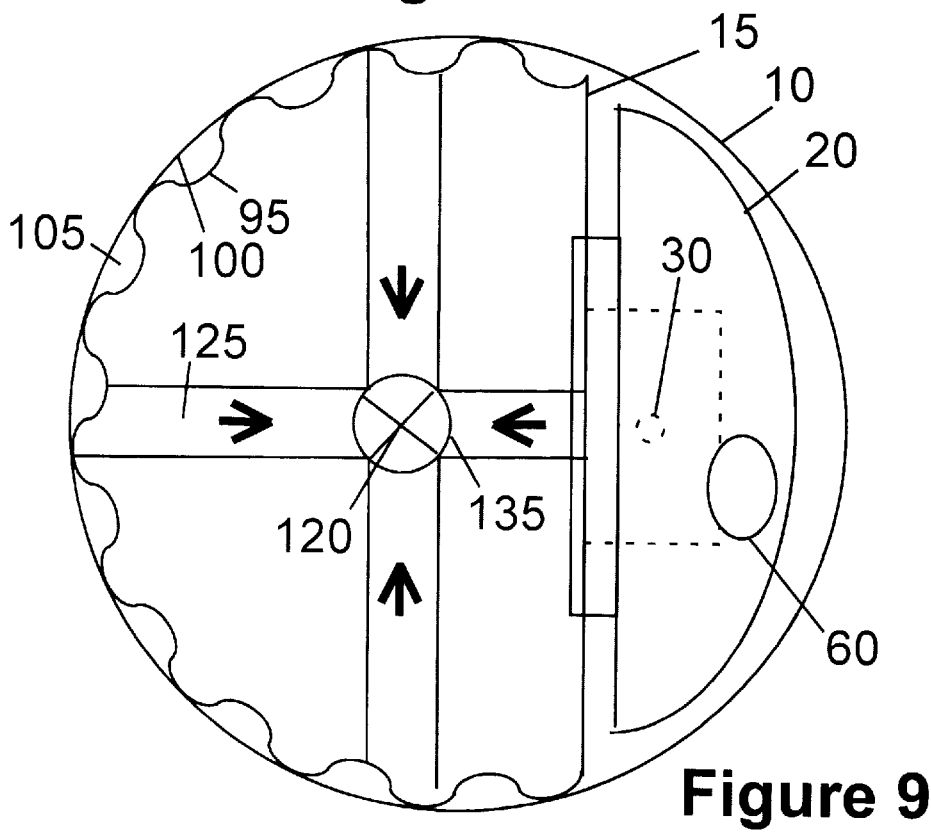
FIG. 9 is the cross-sectional view of FIG. 8 along line 9—9.

FIG. 8 is a cross-sectional view of another alternate embodiment of the present invention. This embodiment has basically the same construction of FIG. 6 except that the discharge air from air circulation fan 120 is directed upward to include a lamp 140 to the discharge duct 135 along with a glass shield 145 and a lamp shade 150 in addition to maximize the interface areas of ambient air with the potting medium and the root system of the plants (not shown). FIG. 9 is the cross-sectional view of FIG. 8 along line 9—9. The wavy side walls 95 of the planter insert 15 against the inside surfaces of the planter side walls 100 formed narrow air passageways 105. The heat of the lamp will heat the air and cause the air to rise and pass through the air gap 155 between light bulb 140 and the glass shield 145. This rise of air creates a suction at the discharge duct 135 which in turn pulls ambient air to pass through potting medium and the root system than through holes or perforation 110 and down the air passageways 105, the air inlet ducting 125 to the discharge duct 135. The circulation fan 120 located at the bottom of the discharge duct 135 and above the water level line 35 will enhance air circulation further. Too much air flow may cause the light bulb 140 being unable to heat the air hot enough for sterilization. Potting medium (not shown) fills the insert where the plant is potted. The bottom layer of the potting medium submerged under the water level line 35. Capillary action along with the suction of the root system carry water to the upper portion of the potting medium and therefore support the plant growth. A small transparent area 60 on the water reservoir 20 is also shown where the water level indicator may be attached.

Figure 10:
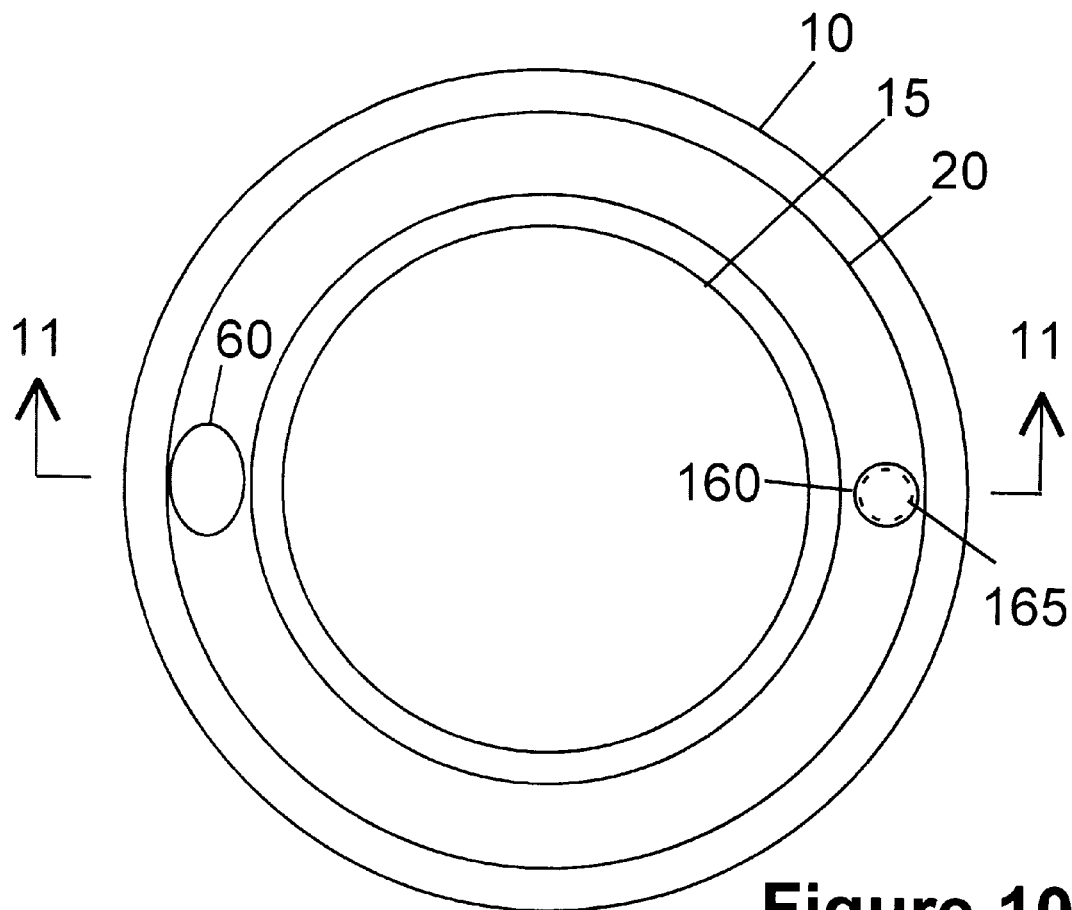
FIG. 10 is a top view of another alternate embodiment of the present invention.
Figure 11:
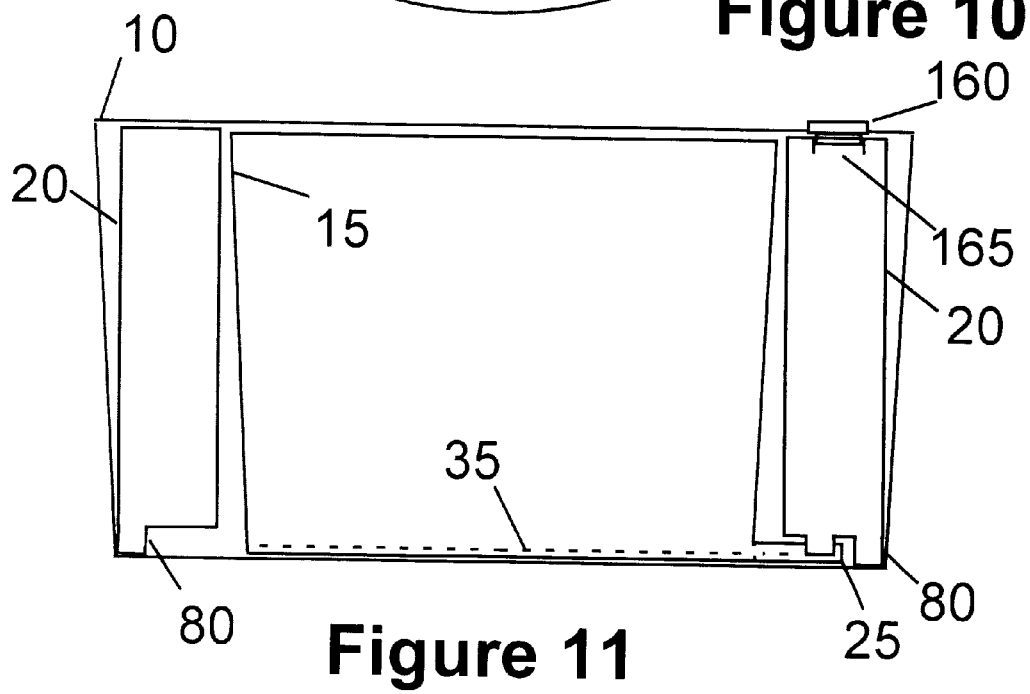
FIG. 11 is the cross-sectional view of FIG. 10 along line 11—11.

FIG. 10 shows yet another alternate embodiment of the present invention. The planter insert 15 can be in the form of any one of the pre-mentioned designs as shown in FIGS. 1, 2, and 5–9 however, the water reservoir is very large and will be set in place and not to be removed for refilling. The shape of the water reservoir as shown in FIG. 10 is in the form of a donut but can be in the forms of a rectangular, semi circular or any other suitable shape. FIG. 11 shows the cross-sectional view of FIG. 10 along line 11—11. When water in the water reservoir is exhausted, a refill cap 160 is removed from the refill opening 165 for refill. At this time, the partial vacuum inside the water reservoir is no longer exist and any water filled into the water reservoir will immediately tend to flow out from the discharge mouth opening 30 and flood the planter insert 15 to cause the water line 35 to rise. A special design as shown in FIG. 12 will prevent it from happening. FIG. 12-A is a simple assembly 170 to be inserted into the water reservoir 20 (FIGS. 12-B, and 12-C) at the refill opening 165. This simple assembly 170 has a small insert 175 in the form of an inverted cup which slide fitted and covers the discharge mouth opening 30 as shown in FIGS. 12-B and 12-C. A flapper 180 with a bent arm 185 is attached to the small insert 175 at the hinge 190. At the other end of the bent arm 185 is hinge mounted with a push rod 195. The upper end of the push rod will be anchored to the refill opening 165 with any suitable means and allowed to slide up and down. A new discharge opening 200 is made on the small insert 175. The flapper 180 is heavier than the total weight of the bent arm 185 and the push rod 195 and therefore tend to flip down while raising the bent arm 185 and push up the push rod 195 as shown in FIG. 12-B when the refill cap 160 is removed from the refill opening 165. When the flapper 180 drops down, it covers and seals the new discharge opening 200 and stops the water from flowing out of the water reservoir during refilling. FIG. 12-C shows that when the water is refilled and the refill cap 160 is attached to the refill opening 165. At the same time, the refill cap also pushes down the push rod 195 and tilting the bent arm to lift the flapper 180. The lifting of the flapper uncovers the discharge opening 200 thereby allows water to flow out. Otherwise, the operation of the planter insert and the water reservoir is the same as those described in FIGS. 1,2, and 5–9. A small transparent area 60 on the water reservoir 20 is also shown where the water level indicator may be attached.

FIG. 13 shows an alternate design of FIG. 12 to control water flow during water reservoir refill. FIG. 13-A shows the refill cap 160 is removed from the refill opening 165 for water refill. A three armed rock arm 205 is attached near the refill opening allowing to pivot the third arm of the three armed rock arm between two up and down positions as shown in FIGS. 13-A and 13-B. The refill cap 160 has a concave shaped plug 210 (as shown in FIG. 13-B) which will trigger the pivoting of the three armed rock arm to pivot. When the refill cap 160 is removed from the refill opening 165, the concave shaped plug 210 will cause the three armed rock arm to turn clockwise to the position as shown in FIG. 13-A. At this position, the third arm 215 of the three armed rock arm 205 is in the down position which lowers the stopper flapper 220 by lowering the string 225 connecting them. The stopper flapper 220 at the down position covers the discharge mouth opening 30 and therefore prevented water from flowing out of the water reservoir 20 during refill. After the water reservoir 20 is refilled and the refill cap 160 is replaced to the water reservoir, the concave shaped plug 210 will push the three armed rock arm 205 to rotate in the counter-clockwise direction to the position shown in FIG. 13-B. In this case the third arm 215 of the rock arm 205 is in the upper position and lifting the string 225 and stopper flapper 220. In this position, the stopper flapper uncovers the discharge mouth opening 30 and allows water to flow. The water level in the planter insert is controlled the same way as that described earlier.

Figure 14:
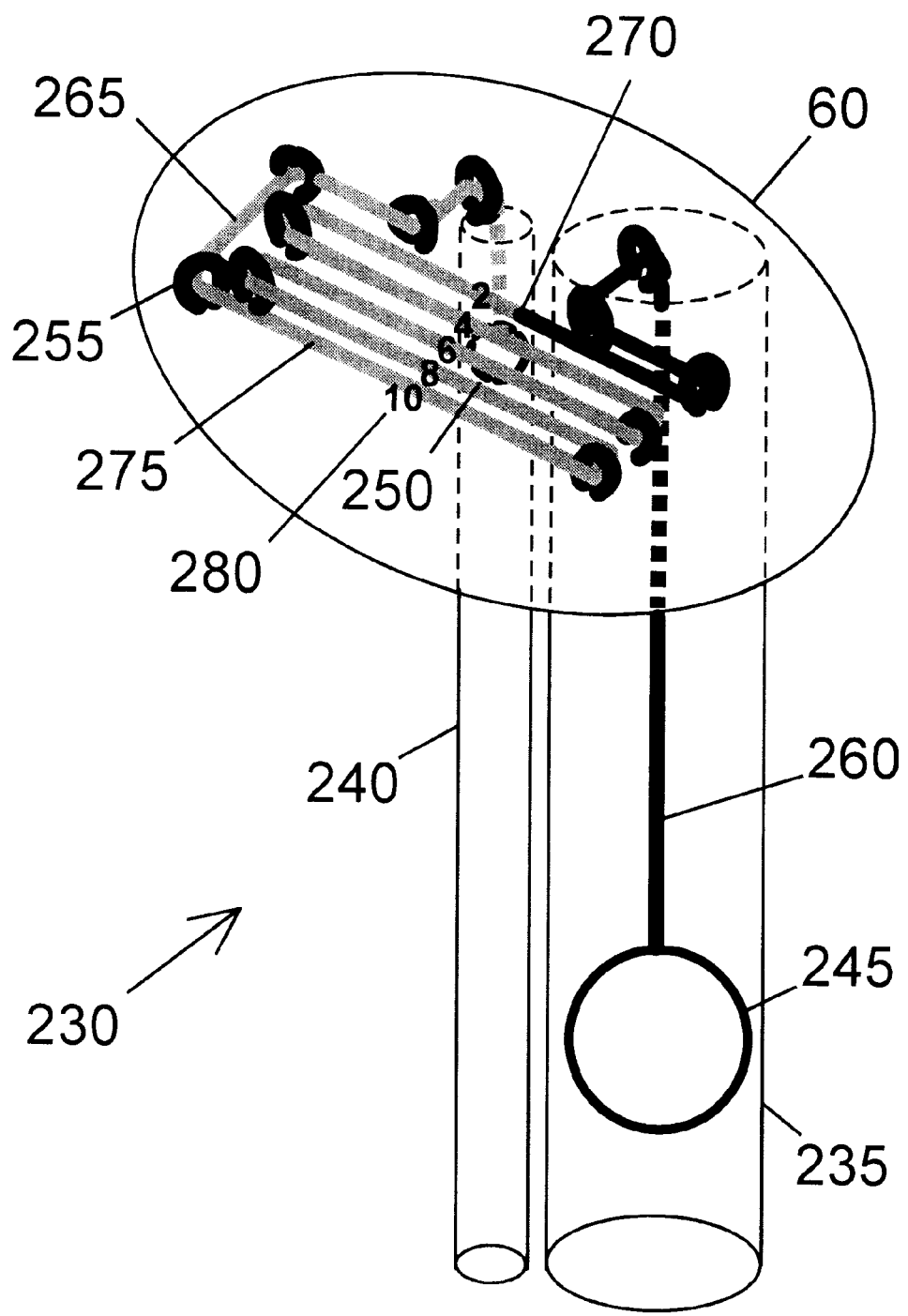
FIG. 14 shows a water level indicator to be used in all water reservoirs of the present invention.

FIG. 14 shows a water level indicator 230 of the present invention. The objective of this indicator is to show the full range of water level inside the water reservoir from a relatively small viewing area 60, a small transparent piece of mounting surface. Attached to this small piece of surface are two guide tubes 235 and 240 (can be guide rails or any other suitable guiding structures), one for the float 245 and the other for the weight 250. There are also a number of hoops or clamps 255 on the mounting surface 60. A string divided into two colored sections say red section 260 and white section 265 and connected at the junction 270 connects the float 245 and the weight 250 at the two ends. The string loops around the hoops or clamps 255 in a zigzag path 275 as shown in FIG. 14 in a very small area. If the water reservoir has transparent surfaces, this water level indicator can be attached to the inside surface of the water reservoir. Otherwise, the water reservoir can have a cut opening and replaced it with the transparent piece of this water level indicator and the joint line sealed. After the water reservoir is inserted into the planter, the transparent piece 60 of the water level indicator is on the top as indicated in FIG. 14. When the water in the water reservoir is full, the float 245 will be floated to the top and the weight 250 will sink to the bottom of the water reservoir. As water gradually leave the water reservoir and the water level start to drop, the float 245 will follow the water level and start to drop as well. The weight 250 on the other end of the string is lighter than the float and thus being pulled up and hanging in the air. The length of the string is (the combined length of red 260 and white 265 strings) properly measured so that it is always in tension between the float 245 and the weight 250. The up and down movement of the float 245 due to the water level change also cause the junction point 270 of the two colored string to move along the zigzag path 275. When water is full, the float is up and the red string will be showing in the zigzag path 265. When water is nearly empty as shown in FIG. 14, the float will be near the bottom and more white string will be showing in the zigzag path. Calibration marking 280 can thus be placed on the transparent piece to indicate the true water level for the entire range of the water reservoir. This water level indicator can be applied to any one of the previously described water reservoir 20 where only the viewing areas 60 were depicted while the detailed water level indicator structures were omitted in those views. It can also be applied to any other liquid container where the viewing area is limited to a small area at one end of the container.

Various modifications to the depicted and described apparatus will be apparent to those skilled in the art. Accordingly, the forgoing detailed description of the preferred embodiment should be considered exemplary in nature and not as limiting to the scope and spirit of the invention as set forth in the appended claims.

What is claimed is:

1. An apparatus for potting plants comprising:

a planter insert with side walls and a bottom to form a container to be inserted into a planter, wherein plants can be potted using potting medium; and removable and external to the said planter insert, a water reservoir for storing water to be inserted into the planter and the planter insert; and said water reservoir having an extended curved neck with a mouth opening; and a shallow water well exterior to the bottom of the said planter insert providing means of insertion for the said water reservoir; and the mouth opening of the extended curved neck inserted to the shallow water well of the said planter insert; and while inserted to the planter insert a constant water level up to the mouth opening of the said water reservoir is maintained inside the planter insert for as long as there is water inside the water reservoir; and the water level surrounding the mouth opening of the water reservoir stops the further release of water from the water reservoir; and said water reservoir is removed from the planter for refill each time when the water is exhausted; and said water reservoir is turned upside down for insertion into the planter and to the planter insert after refill; and said removable water reservoir prevents the spillage of water while the water reservoir is turned upside down before insertion; and a water level indicator is capable of showing the full range of water levels inside the water reservoir from a small viewing area seen on the top of the water reservoir (the upper surface of the water reservoir when the water reservoir is turned in the inserted position); and a bottom layer of the potting medium will be in contact with water at the bottom of the planter insert; and capillary action of the potting medium and suction from the plant roots will lift water to upper layers of the potting medium to support plant growth wherein multiple planter inserts may be inserted into the same planter and sharing the same water reservoir for water supply.

2. The apparatus of claim 1 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and the natural transpiration of the plant allows the draw of ambient air into the wavy air passageways which passes through the small holes or perforations of the wavy side walls of the said planter insert into the potting medium and finally completes a cycle by discharging back to the ambient through the top surface of the potting medium and through the plant leaves; and a maximized interface contact area between the potting medium and the wavy side walls of the said planter insert enables the maximization of the circulation air flow without artificial enhancement with a circulation fan.

3. The apparatus of claim 1 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and a circulation fan; and partition walls at the bottom of the planter insert provide ducting for air to flow from the wavy air passageways to a fan inlet; and exhaust ducting guides the discharge air back to the ambient; and suction of the circulation fan pulls ambient air from the top surface of the potting medium through the plant root system which passes through the small holes or perforations of the wavy side walls of the said planter insert into the wavy air passageways and to a suction end of the circulation fan and completes a cycle by discharging back to the ambient through discharge ducting; and a maximized interface contact area between the potting medium and the wavy side walls of the said planter insert enables the circulation fan to have minimized resistance and maximized interface areas for air to flow through the potting medium therefore maximizing the effectiveness of the circulation fan.

4. The apparatus of claim 1 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert have multiple small holes or perforations to allow air flow through the wavy side walls of the said planter insert between the potting medium and the wavy air passageways; and partition walls at the bottom of the planter insert provide ducting for air to flow from the wavy air passageways to an exhaust duct extended from the bottom center of the planter insert straight up beyond the top of the potting medium and guides the discharge air back to the ambient; and a light bulb is situated at the top of the exhaust duct; and a transparent lamp shield surrounds the light bulb thereby forcing the exhaust air to pass through a restricted air space surrounding the light bulb; and the heating of the light bulb creates an uplifting suction of air and causes a partial vacuum in the wavy air passageways and therefore pulls ambient air from the top surface of the potting medium through the plant root system and passes through the small holes or perforations of the wavy side walls of the said planter insert into the wavy air passageways; and before discharging to the ambient, air is being heated by the light bulb for sterilization; and a maximized interface contact area between the potting medium and the wavy side walls of the said planter insert enables the air circulation flow through the potting medium to be maximized without artificial enhancement with a circulation fan.

5. The apparatus of claim 1 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert have multiple small holes or perforations to allow air flow through the wavy side walls of the said planter insert between the potting medium and the wavy air passageways; and a circulation fan; and partition walls at the bottom of the planter insert provide ducting for air to flow from the wavy air passageways to a fan inlet; and exhaust ducting from the exit end of the circulation fan guides the discharge air back to the ambient; and a light bulb is situated at the top of the exhaust duct; and a transparent lamp shield surrounds the light bulb thereby forcing the exhaust air to pass through a restricted air space surrounding the light bulb; and suction of the circulation fan pulls air from the top surface of the potting medium through the plant root system and passes through the small holes or perforations of the wavy side walls of the said planter insert into the wavy air passageways and to a suction end of the circulation fan and completes a cycle by discharging back to the ambient through discharge ducting; and before discharging to the ambient, air is being heated by the light bulb for sterilization; and a maximized interface contact area between the potting medium and the wavy side walls of the said planter insert enables the circulation fan to have minimized resistance and maximized interface areas for air to flow through the potting medium therefore maximizing the effectiveness of the circulation fan.

6. The apparatus of claim 1 wherein the removable external water reservoir further comprises:

a container for the storage of water with a major axis along the center line of the container; and an extended curved neck at the top region of the container; and a curved passageway along a center line of the said extended curved neck with a mouth opening communicating the interior of the water reservoir with the ambient; and said curved passageway has the basic form of a number "7", a letter "Z", or a letter "S"; and said mouth opening is located at the terminating end of the said curved passageway; and after filling the water reservoir with water, the water reservoir may be laid down with the bottom end of the water reservoir being higher than the top end of the water reservoir without spilling water as long as the "7" or "Z" or "S" shaped extended curved neck is positioned such that the extended curved neck having the form of "7" or "Z" or "S" is oriented in the upright direction when the water reservoir is laid down (the major axis being in the substantially horizontal direction) and the mouth opening of the extended curved neck having the form of "7" or "Z" or "S" is on the uppermost position; and size, shape, and curvature of the curved passageway determine a start-to-flow angle where water inside the water reservoir will begin to flow out from the water reservoir.

7. The apparatus of claim 1 wherein the water level indicator further comprises:

a small transparent viewing piece with two guide tubes or similar devices having the full length of the water reservoir and a number of hoops attached; and a dual-colored string with one section colored white and the other section colored red or any other different combination of colors; and a float and a weight guided by the said two guide tubes can freely slide up or down the full length of the guide tubes; and the dual-colored string loops around the hoops in a zigzag pattern with the red end tied to the float and the white end tied to the weight; and the small transparent viewing piece is attached to the top inside of the water reservoir when the top of the water reservoir is transparent (the top of the water reservoir referring to the upper surface of the water reservoir when it is turned over in the inserted position); and the small transparent viewing piece replaces a small section of the top of the water reservoir if the top of the water reservoir is opaque; and when water is full inside the water reservoir, the float will float to the top of the guide tube and the weight will sink to the bottom of the guide tube on the other end of the string; and when water is gradually discharged from the water reservoir, and the water level starts to drop, the float follows the water level and starts to drop as well, in the mean time pulling the weight up on the other end of the string; and the dual-colored string moves along the zigzag path around the small transparent viewing piece with a major portion of the viewing area showing red string when the water reservoir is full and a major portion of the viewing area showing white string when the water reservoir is near empty; and calibration markings along the zigzag path of the string will be able to indicate the full range of the water level inside the water reservoir.

8. An apparatus for potting plants comprising:

a planter insert with side walls and a bottom to form a container may be inserted into a planter, wherein plants can be potted using potting medium; and separate and external to the said planter insert, a water reservoir for storing water; and said water reservoir is refilled each time when the water is exhausted; and a water level indicator is capable of showing the full range of water levels inside the water reservoir from a small viewing area seen on the top of the water reservoir (the upper surface of the water reservoir when the water reservoir is turned in the seated position); and a shallow water well exterior to the bottom of the said planter insert and connected to the inside of the said planter insert through a small opening at the bottom side wall of the said planter insert provides means of accepting discharge mouth opening of the said water reservoir; and while the water reservoir is seated a mouth opening in the water reservoir is mated to the shallow water well and a constant water level up to the mouth opening of the said water reservoir is maintained inside the planter insert for as long as there is water inside the water reservoir; and the water level surrounding the mouth opening of the water reservoir stops the further release of water from the water reservoir; and a bottom layer of the potting medium will be in contact with water in the bottom of the planter insert; and capillary action of the potting medium and suction from the plant roots will lift water to upper layers of the potting medium to support plant growth wherein multiple planter inserts may be inserted into the same planter and sharing the same water reservoir for water supply.

9. The apparatus of claim 8 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and the natural transpiration of the plant allows the draw of ambient air into the wavy air passageways which passes through the small holes or perforations of the wavy side walls of the said planter insert into the potting medium and finally completes a cycle by discharging back to the ambient through the top surface of the potting medium and through plant leaves; and a maximized interface contact area between the potting medium and the wavy side walls of the said planter insert enables the maximization of the circulation air flow without artificial enhancement with a circulation fan.

10. The apparatus of claim 8 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and a circulation fan is installed at the bottom of the planter insert slightly above a water level line of the planter insert; and partition walls at the bottom of the planter insert provide ducting for air to flow from the wavy air passageways to a fan inlet; and exhaust ducting guides the discharge air back to the ambient; and the circulation fan is imbedded inside the potting medium for vibration and noise attenuation; and suction of the circulation fan pulls ambient air from the top surface of the potting medium through the plant root system which passes through the small holes or perforations of the wavy side walls of the said planter insert into the wavy air passageways and to a suction end of the circulation fan and completes a cycle by discharging back to the ambient through discharge ducting; and a maximized interface contact area between the potting medium and the wavy side walls of the said planter insert enables the circulation fan to have minimized resistance and maximized interface areas for air to flow through the potting medium therefore maximizing the effectiveness of the circulation fan.

11. The apparatus of claim 8 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and partition walls at the bottom of the planter insert provide ducting for air to flow from the wavy air passageways to an exhaust duct extended from the bottom center of the planter insert straight up beyond the top of the potting medium and guides the discharge air back to the ambient; and a light bulb is situated at the top of the exhaust duct; and a transparent lamp shield surrounds the light bulb thereby forcing the exhaust air to pass through a restricted air space surrounding the light bulb; and the heating of the light bulb creates an uplifting suction of air and causes a partial vacuum in the wavy air passageways and therefore pulls ambient air from the top surface of the potting medium through the plant root system and passes through the small holes or perforations of the wavy side walls of the said planter insert into the wavy air passageways; and before discharging to the ambient, air is being heated by the light bulb for sterilization; and a maximized interface contact area between the potting medium and the wavy side walls of the said planter insert enables the air circulation flow through the potting medium to be maximized without artificial enhancement with a circulation fan.

12. The apparatus of claim 8 further comprising:

wavy side walls of the said planter insert projecting against the interior surfaces of the planter side walls; and the wavy side walls of the said planter insert and the interior surfaces of the planter side walls form wavy air passageways to allow air flow; and the wavy side walls of the said planter insert having multiple small holes or perforations to allow air flow through the wavy side walls of the said planter insert between the potting medium and the wavy air passageways; and a circulation fan is installed at the bottom of the planter insert slightly above a water level line of the planter insert; and partition walls at the bottom of the planter insert provide ducting for air to flow from the wavy air passageways to a fan inlet; and exhaust ducting from an exit end of the circulation fan guides the discharge air back to the ambient; and the circulation fan is imbedded inside the potting medium for vibration and noise attenuation; and a light bulb is situated at the top of the exhaust duct; and a transparent lamp shield surrounds the light bulb thereby forcing the exhaust air to pass through a restricted air space surrounding the light bulb; and suction of the circulation fan pulls air from the top surface of the potting medium through the plant root system and passes through the small holes or perforations of the wavy side walls of the said planter insert into the wavy air passageways and to a suction end of the circulation fan and completes a cycle by discharging back to the ambient through discharge ducting; and before discharging to the ambient, air is being heated by the light bulb for sterilization; and a maximized interface contact area between the potting medium and the wavy side walls of the said planter insert enables the circulation fan to have minimized resistance and maximized interface areas for air to flow through the potting medium therefore maximizing the effectiveness of the circulation fan.

13. The apparatus of claim 8 wherein the separate external water reservoir further comprises:

a container for the storage of water with a removable refill cap at a refill opening on top of the water reservoir; and a discharge mouth opening in line with the refill opening at the bottom of the water reservoir; and a small insert having the shape of an inverted cup snugly fitted to the discharge mouth; and a small opening at the base of the inverted cup of the said small insert; and a flapper connected with a bent arm is mounted to the said inverted cup with a hinge; and a push rod is hinge mounted to the bent arm on the opposite end of the flapper; and the upper end of the push rod is attached to the refill opening, allowing the push rod to slide up and down; and while the refill cap is removed for refill, the weight of the flapper drops down and tilts up the bent arm and allows the upward slide of the push rod; and the flapper covers the said small opening at the base of the inverted cup, thereby stopping water from flowing out of the water reservoir during refilling; and after the refilling of water is completed and the refill cap is replaced on to the refill opening, the refill cap pushes down the push rod; and the downward push of the push rod also pushes down the bent arm and lifts up the flapper on the other end of the bent arm and uncovers the said small opening at the base of the inverted cup thereby resuming the release of water from the water reservoir and enabling the control of water level in the planter insert.

14. The apparatus of claim 8 wherein the separate external water reservoir further comprises:

- a container for the storage of water with a removable refill cap at a refill opening on top of the water reservoir; and
- a discharge mouth opening in line with the refill opening at the bottom of the water reservoir; and
- a three armed rock arm is attached near the refill opening and allowed to pivot between upper and lower positions of the third arm of the said three armed rock arm; and
- the said refill cap further has a concave shaped plug attached to the under side of the refill cap; and
- when the refill cap is inserted to the refill opening, the concave shaped plug pushes and turns the three armed rock arm in a counter clockwise rotation thereby lifting the third arm of the three armed rock arm to the upper position; and
- when the refill cap is removed from the refill opening, the concave shaped plug lifts and turns the three armed rock arm in a clockwise rotation thereby tilting the third arm of the three armed rock arm to the lower position; and
- a stopper flapper is attached to the bottom of the water reservoir covering the said discharge mouth opening; and
- a string is attached to the third arm of the three armed rock arm on one end and to the stopper flapper on the other end; and
- the upper or lower position of the third arm of the three armed rock arm will cause the lifting or lowering of the stopper flapper and thereby opening or closing the discharge mouth opening of the water reservoir, thus allowing the refill of water to the water reservoir without spilling and enabling the control of water level in the planter insert after the refill.

15. The apparatus of claim 8 wherein the water level indicator further comprises:

- a small transparent viewing piece with two guide tubes or similar devices having the full length of the water reservoir and a number of hoops attached; and
- a dual-colored string with one section colored white and the other section colored red or any other different combination of colors; and
- a float and a weight guided by the said two guide tubes can freely slide up or down the full length of the guide tubes; and
- the dual-colored string loops around the hoops in a zigzag pattern with the red end tied to the float and the white end tied to the weight; and
- the small transparent viewing piece is attached to the top inside of the water reservoir when the top of the water reservoir is transparent (the top of the water reservoir referring to the upper surface of the water reservoir when it is turned over in the inserted position); and
- the small transparent viewing piece replaces a small section of the top of the water reservoir if the top of the water reservoir is opaque; and
- when water is full inside the water reservoir, the float will float to the top of the guide tube and the weight will sink to the bottom of the guide tube on the other end of the string; and
- when water is gradually discharged from the water reservoir, and the water level starts to drop, the float follows the water level and starts to drop as well, in the mean time pulling the weight up on the other end of the string; and
- the dual-colored string moves along the zigzag path around the small transparent viewing piece with a major portion of the viewing area showing red string when the water reservoir is full and a major portion of the viewing area showing white string when the water reservoir is near empty; and
- calibration markings along the zigzag path of the string will be able to indicate the full range of the water level inside the water reservoir.

* * * * *